United States Patent
Massie

[19]

[11] Patent Number: 5,831,405
[45] Date of Patent: Nov. 3, 1998

[54] HIGH PRECISION FAN CONTROL/ALARM CIRCUIT

[75] Inventor: Harold L. Massie, West Linn, Oreg.

[73] Assignee: Intel Corporation, Santa Clara, Calif.

[21] Appl. No.: 649,353

[22] Filed: May 17, 1996

[51] Int. Cl.$^6$ .................................................. G05B 5/00
[52] U.S. Cl. .................................. 318/471; 318/798.815; 318/641; 318/783; 318/234; 318/439; 318/138; 388/934
[58] Field of Search ........................... 318/471, 798–815, 318/641, 783, 254, 439, 138; 361/25, 27; 388/934; 236/49.3

[56] References Cited

U.S. PATENT DOCUMENTS

| | | | |
|---|---|---|---|
| 4,194,129 | 3/1980 | Dumbeck | 318/490 X |
| 4,284,943 | 8/1981 | Rowe | 318/806 |
| 4,510,548 | 4/1985 | Boothman | 318/471 X |
| 4,691,668 | 9/1987 | West | 236/49.3 |
| 5,102,040 | 4/1992 | Harvey | 236/49.3 |
| 5,123,081 | 6/1992 | Bachman et al. | 388/934 |
| 5,364,026 | 11/1994 | Kundert | 236/49.3 |
| 5,563,480 | 10/1996 | Okada | 318/254 |
| 5,566,062 | 10/1996 | Quisenberry et al. | 318/800 X |
| 5,632,156 | 5/1997 | Takeo et al. | 236/49.3 |

*Primary Examiner*—Karen Masih
*Attorney, Agent, or Firm*—Kenyon & Kenyon

[57] ABSTRACT

A motor speed control circuit includes a temperature sensor providing a first voltage output which is proportional to the temperature and a control voltage generator having an internal voltage reference receiving the first output as an input. The control voltage generator develops a control voltage representative of a desired motor speed profile which varies substantially linearly between a first predetermined temperature and a second predetermined temperature and supplies the control voltage to a motor drive circuit with a motor drive voltage at its output. The control voltage is fed back to the temperature sensor to achieve a controlled, fast rising slope. A second feedback circuit results in a reduced slope of the voltage between the second predetermined temperature and a third predetermined temperature at which an alarm signal is generated. The circuit also is able to detect a stopped motor and provide an alarm.

38 Claims, 4 Drawing Sheets

HIGH PRECISION FAN CONTROL/ALARM CIRCUIT

BACKGROUND OF THE INVENTION

This invention relates to motor control circuits in general and more particularly to a high precision fan control and alarm circuit.

Electronic equipment generates heat and it is common practice to cool such equipment with a motor driven fan. Examples of such electronic equipment are the power supplies used in computer systems and the computer systems themselves. In essentially all such systems, the power supply is cooled by a fan. In most servers and in some desktop personal computer systems, there is a primary fan, cooling the power supply, and at least one secondary fan used to cool the system boards.

In operating these fans, it is desirable to control the speed of the fan such that at a temperature below a first predetermined a temperature the fan speed will be in a low speed state but that, as temperature increases, the speed of the fan will increase linearly until a second predetermined temperature is reached. Above the second temperature the fan should run at an approximately constant speed. The maximum speed at high temperatures is determined by the fan rating. With the typical fan motor, this requires supplying a first minimum voltage to achieve the low speed state when the temperature is less than the first predetermined temperature and a second, maximum voltage which remains constant at and above the second predetermined temperature with an essentially linear change in voltage as temperature changes between the first and second predetermined temperatures. The basic reason for controlling fan speed in this nature is to run the fan at the slowest possible speed while providing adequate cooling to avoid noise.

Various prior art arrangements have been developed to attempt to solve this problem. Typically this is accomplished using a thermistor in a voltage divider which generates a voltage used, through various amplifying circuits, to control the motor. However, typical prior art systems suffer from disadvantages. First, they are not particularly precise. Furthermore in most instances, they, start at a voltage of about 25° C. and linearly increase the fan speed up to a maximum speed at a temperature of about 50° C. The ramp rate is, thus, relatively slow and because of this, the fan tends to run at higher speeds than necessary at 25° C. and does not run at a high enough speed at 40° C. Furthermore, such prior art circuits do not adequately provide both a good precise speed control and at the same time generate an alarm if a third predetermined temperature is reached.

Thus, there is need for a simple low cost circuit which will provide an accurate fan voltage which varies as a function of temperature, as the temperature varies between a first predetermined temperature and a second predetermined temperature. Such a circuit should be highly accurate and should provide a fast ramp, preferably between a first predetermined temperature of about 30° C. up to a second predetermined temperature of, for example, 40° C. The circuit needs to be able to generate a further ramp between the second predetermined temperature and a third predetermined temperature at which an over-temperature alarm is to be sounded, for example, at 55° C. Preferably the circuit should also have the ability to provide a fan failure signal.

SUMMARY OF THE INVENTION

The present invention provides these capabilities. Although disclosed in connection with a motor driven fan, the control circuit can be used with any motor which is required to have a temperature dependent speed, e.g., a motor used in a liquid cooling system. In the illustrated embodiment, the temperature at the inlet of the fan, i.e., where the heated air is being drawn into the fan, is sensed with a thermistor which provides an accurate thermistor reference voltage proportional to its resistance which changes as temperature changes. The reference voltage output is the input to a circuit which generates a control voltage for controlling the fan voltage. This circuit contains a very accurate internal voltage reference and generates a minimum voltage when the thermistor voltage has a value which exceeds the internal reference voltage. It generates a voltage which changes linearly between the minimum value and a maximum value as temperature changes between a first predetermined temperature and a second predetermined temperature, by developing a ramp controlled by feeding voltage back to the thermistor circuit. The voltage is held substantially at the maximum value at temperatures over the second predetermined value. The linear ramp generated has a first slope to provide a fast ramp. The motor control voltage generated by this circuit is an input to a motor driver circuit which supplies power to the fan motor at a voltage proportional to the control voltage.

In accordance with another feature of the present invention an over-temperature alarm is provided. Between the second predetermined temperature and a third predetermined temperature, a circuit is provided for feeding back a second voltage to the circuit which generates the control voltage, causing it to generate a voltage ramp with a slope much less than the slope generated between the first and second predetermined temperatures, thereby providing a slow ramp between the second and third predetermined temperatures. When the voltage corresponding to the third predetermined temperature is exceeded the alarm signal is provided.

Also included is a fan failure protection circuit which converts the current pulses of the motor into voltage pulses, senses a lack of such pulses and upon such sensing provides an alarm voltage.

The control circuit can be used with any motor, the speed of which must vary as a function of temperature. However, it is particularly well suited for use with a fan motor such as a fan motor driving a fan used to cool electronic equipment. Illustrated are examples of the use of such a fan in a power supply and in a computer system.

DETAILED DESCRIPTION

Figure 1:
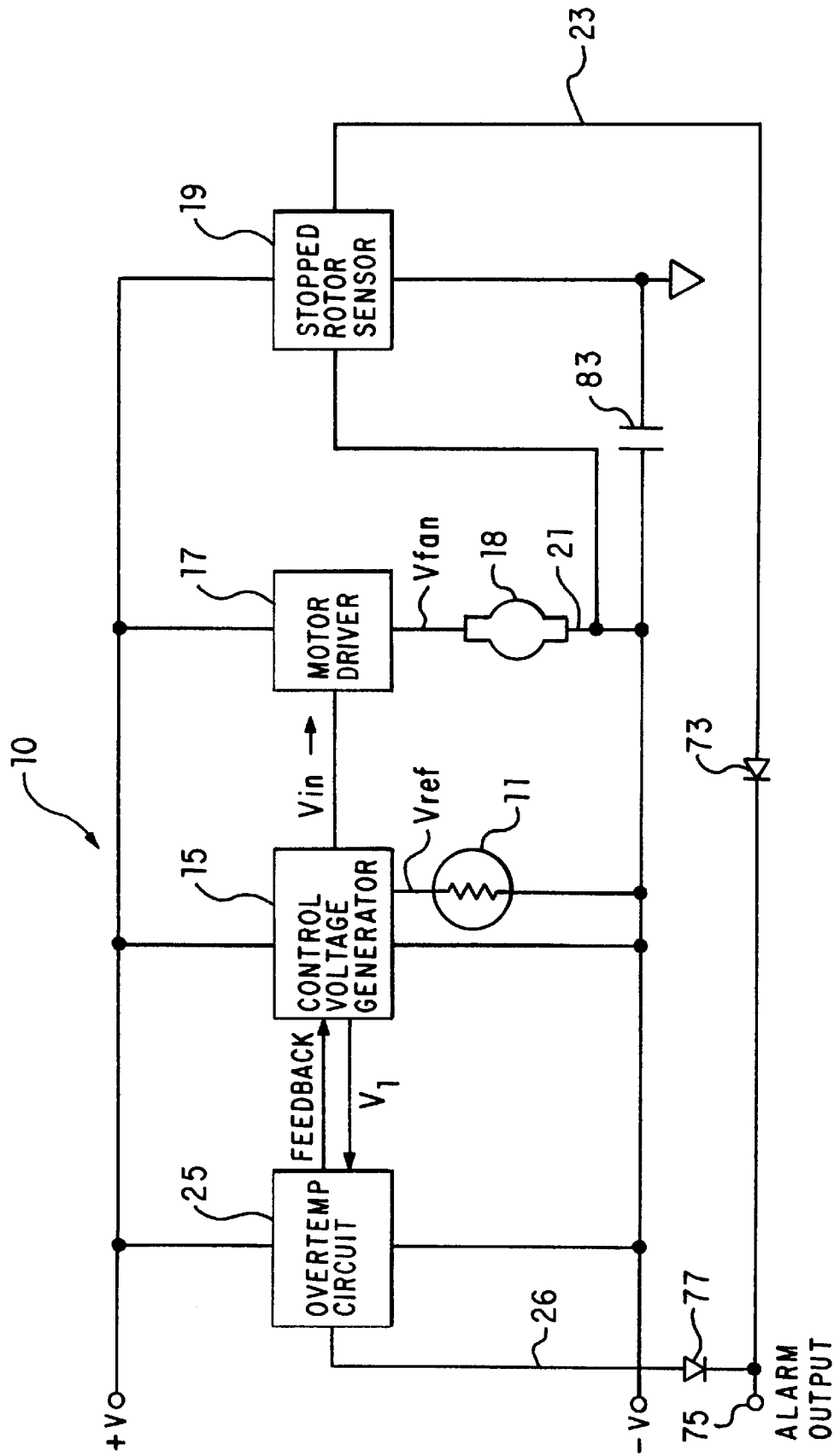
FIG. 1 is a block diagram of the motor control circuit of the present invention which provides the functions of motor speed control over a narrow temperature range, an over-temperature alarm and a fan failure signal.

FIG. 1 is functional block diagram of the motor control circuit 10 of the present invention. As illustrated, it includes a control voltage generator 15 which uses a voltage across a thermistor 11 as an input. The control voltage generator 15 is coupled across a voltage supply indicated as +V and −V. Thermistor 11 is placed at a location where it is desired to sense the temperature. For example, if used with a fan in a power supply, thermistor 11 could be placed at the fan inlet. Alternatively, in a computer system being cooled by a fan it could be placed in the vicinity of the processor. The thermistor 11 resistance changes with temperature and thus, as explained below in connection with FIG. 2, a voltage Vref inversely proportional to temperature is developed at the junction between it and a resistor. This voltage is provided as an input to a device, within generator 15, having a highly accurate internal reference voltage. This device has at its output a voltage V1 from which a control voltage Vin, which is provided at the output of generator 15, is developed. Vin is at a first, minimum voltage when the thermistor voltage Vref is higher than the internal reference voltage. The Vin output varies substantially linearly from this first minimum value, at or below a first predetermined temperature, where Vref is equal to or greater than the internal reference voltage, to a substantially maximum value at or above a second predetermined temperature. As will be explained below, the slope of the ramp is controlled by feeding a voltage back to the voltage divider including the thermistor. As an example, the first predetermined temperature may be 30° C. and the second 40° C. resulting in a fast ramp up. This voltage Vin is the control voltage for a motor driver 17 which provides a motor voltage Vfan, proportional to Vin, to a motor 18, e.g., a fan motor.

Coupled to the control voltage generator 15 is an over-temperature sensor 25 which senses a value of V1 corresponding to a third predetermined temperature and upon sensing such value provides an over-temperature alarm. The voltage V1 generated at the output of the voltage reference within the control voltage generator 15 is provided to the over-temperature circuit 25 where it is used to generate a second feedback signal which is sent back to generator 15. This second feedback signal adjusts the slope of the voltage V1 such that it increases as a function of temperature with less slope than occurred between the first and second predetermined temperature. Thus, the voltage V1 continues to increase at a slower rate until, at the third predetermined temperature, a voltage corresponding to an alarm condition is reached. At this point the over-temperature circuit 25 provides an output on line 26.

Coupled to the motor 18 is a sensing circuit 19 which senses the absence of pulses of current in the motor lead 21 and upon such sensing, provides a motor failure alarm on line 23. The alarm signals on lines 26 and 23 are ORed through diodes to an alarm output terminal 75.

Figure 2:
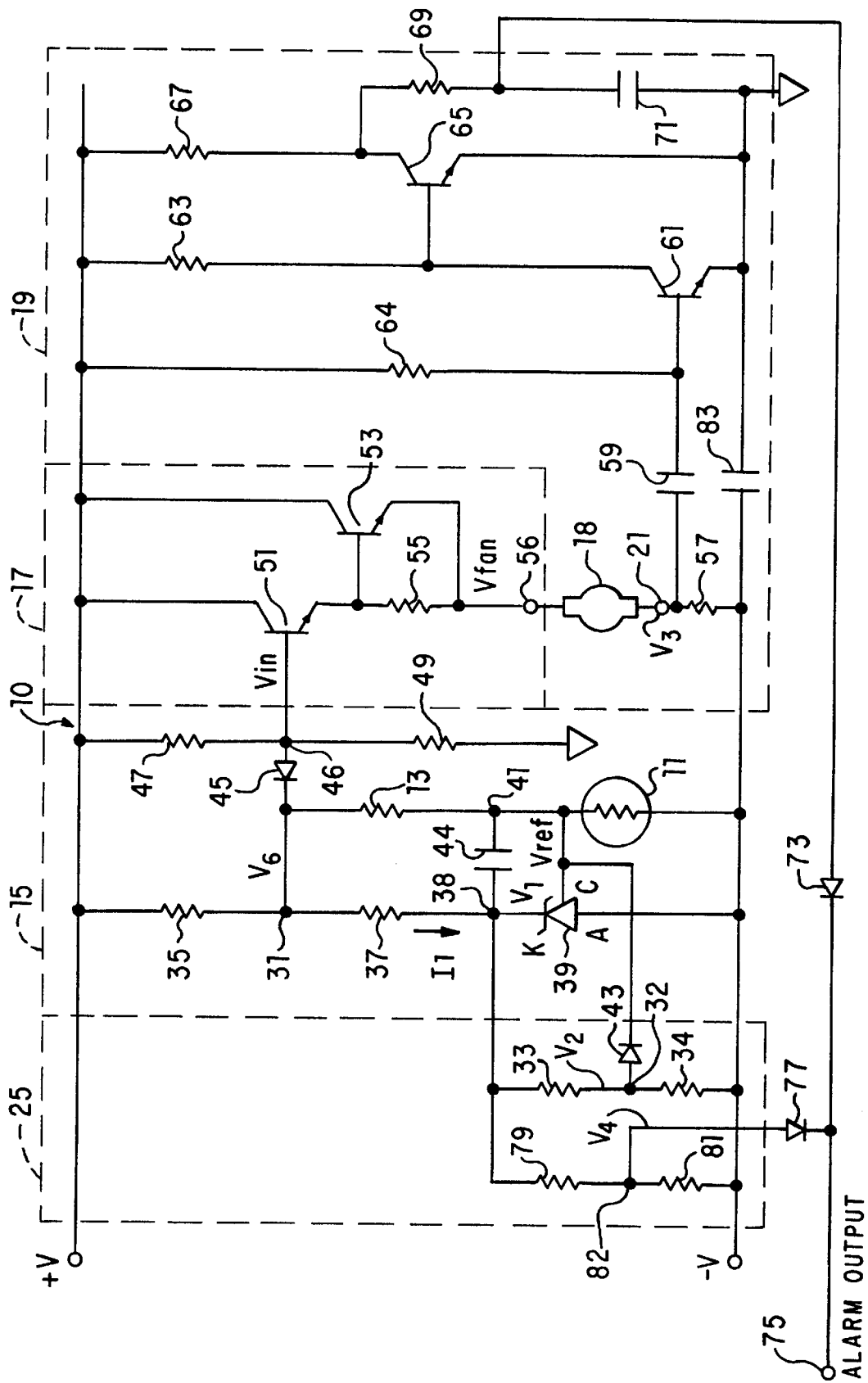
FIG. 2 is a detailed circuit diagram of the motor control circuit of FIG. 1.

FIG. 2 is a circuit diagram of the control/alarm circuit 10 of the present invention. As shown, control voltage generator 15 includes, between the positive voltage terminal +V and the negative voltage terminal −V, a series circuit made up of a resistor 35, a resistor 37 and an integrated circuit 39 (IC39) which contains the built in internal voltage reference referred to above. IC39 has an anode A, a cathode K and a control electrode C. The control electrode C of IC39 is coupled to the junction 41 between thermistor 11 and a resistor 13 at which junction the voltage Vref exists. A capacitor 44 is coupled between junction 41 and the junction 38 which is between resistor 37 and integrated circuit 39. A diode 45 has its cathode coupled to the junction 31 between resistors 35 and 37, to which one end of resistor 13 is also coupled, and its anode coupled to the junction point 46 between a resistor divider made up of resistors 47 and 49 extending between +V and ground.

Motor driver circuit 17 includes transistors 51 and 53 which form a Darlington pair. Junction 46, at which a voltage Vin is developed, is coupled to the base of transistor 51. Voltage Vin is one diode drop above voltage V6 at junction 31. Each of these transistors has its collector coupled to +V. The emitter of transistor 51 is coupled through a resistor 55 to one terminal 56 of the motor 18. The emitter of transistor 53 is connected to resistor 55 on the motor side and the base of transistor 53 is coupled to the emitter of transistor 51.

The over-temperature circuit 25 includes a further resistor divider made up of resistors 33 and 34 extending from the junction 38 between the resistor 37 and IC39, to the negative voltage terminal. A diode 43 extends between the junction 32 between resistors 33 and 34 and junction 41. An alarm output terminal 75 is coupled through a further diode 77 to the junction between two resistors 79 and 81 connected in series between junction 38 and the negative voltage.

The stopped rotor sensor 19 includes a further resistor 57 coupling the other terminal 21 of motor 18 to the negative voltage −V to provide a current-to-voltage conversion. The voltage at terminal 21 is AC coupled through a capacitor 59 to the base of a transistor 61 which has its emitter coupled to ground. The collector of this transistor is coupled through a resistor 63 to the positive voltage. A resistor 64 extends between the positive voltage +V and the base of transistor 61. A transistor 65 has its base coupled to the collector of transistor 61, its emitter coupled to ground and its collector coupled through a resistor 67 to the positive voltage +V. The collector of transistor 65 is also coupled to a resistor 69 in series with a capacitor 71. The junction point between resistor 69 and capacitor 71 is coupled through a diode 73 to output terminal 75. A capacitor 83 is located between −V and ground.

Typical values for the components of the circuit of FIG. 2 are as follows:

| Component | Value | Component | Value |
|---|---|---|---|
| resistor 13 | 11 KΩ | capacitor 44 | 0.1 μF. |
| resistor 33 | 2.74 KΩ | capacitor 59 | 0.01 μF. |
| resistor 34 | 1 KΩ | capacitor 71 | 47 μF. |
| resistor 35 | 220 Ω | capacitor 83 | 22 μF. |
| resistor 37 | 201 Ω | diode 43 | IN4148 |
| resistor 47 | 1 KΩ | diode 45 | IN4148 |
| resistor 49 | 8.25 KΩ | diode 77 | IN4148 |
| resistor 55 | 1 KΩ | diode 73 | IN4148 |
| resistor 57 | 2.2 Ω1w | transistor 51 | 2N2222A |
| resistor 63 | 10 KΩ | transistor 53 | 1247S |
| resistor 64 | 51 KΩ | transistor 61 | 2N2222A |
| resistor 67 | 51 KΩ | transistor 65 | 2N2222A |
| resistor 69 | 100 Ω | thermistor 11 | NTC161 |
| resistor 79 | 3.74 KΩ | integrated circuit 39 | TL431 |
| resistor 81 | 2.74 KΩ | +V | +12 v |
| | | −V | −5 v |

Operation

Thermistor 11 has a resistance which decreases with temperature. For example, the NTC161 Thermistor, listed above, has a resistance of 5K at 25° C. which then decreases below that value as temperature rises. Along with resistor 13, thermistor 11 forms a voltage divider to divide the voltage V6 at junction 31 to establish the voltage Vref. IC39 has a built in reference voltage of 2.5 volts. The current, I1 into the cathode K of IC39 will increase if the voltage Vref is greater than the internal reference of 2.5 volts. I1 will increase until IC39 is saturated. As explained below, when in a linear range, and diode 43 is not conducting, Vref will equal 2.5 v and V6 is determined by the ratio of resistor 13 to thermistor 11. With the values given above, when saturated, the voltage V1 across IC39 is at its minimum voltage of 1.9 volts above −V which is −5 v, in this example. With IC39 in the saturated condition, the voltage V6, and in turn the voltage Vin, will be thus also be at a minimum value, as will the voltage Vfan and the motor, e.g., fan motor 18 speed is also at a minimum. Voltage Vin is one diode drop higher than the voltage V6. The Darlington pair of transistors 51 and 53, in an emitter follower configuration, thus provide a voltage Vfan to the motor which is proportional to Vin.

In the illustrated circuit, at a minimum temperature, e.g., 25° C., integrated circuit 39 is saturated and the voltage V6 is determined by resistors 35 and 37 along with the saturation voltage of the IC39. For the specific embodiment set out above, this gives a minimum fan motor voltage Vfan of around 8.25 volts, above the −V, e.g., −5 v level. (Hereinafter, when a voltage is stated, it should be understood to be the voltage above −V unless otherwise stated.)

Figure 3:
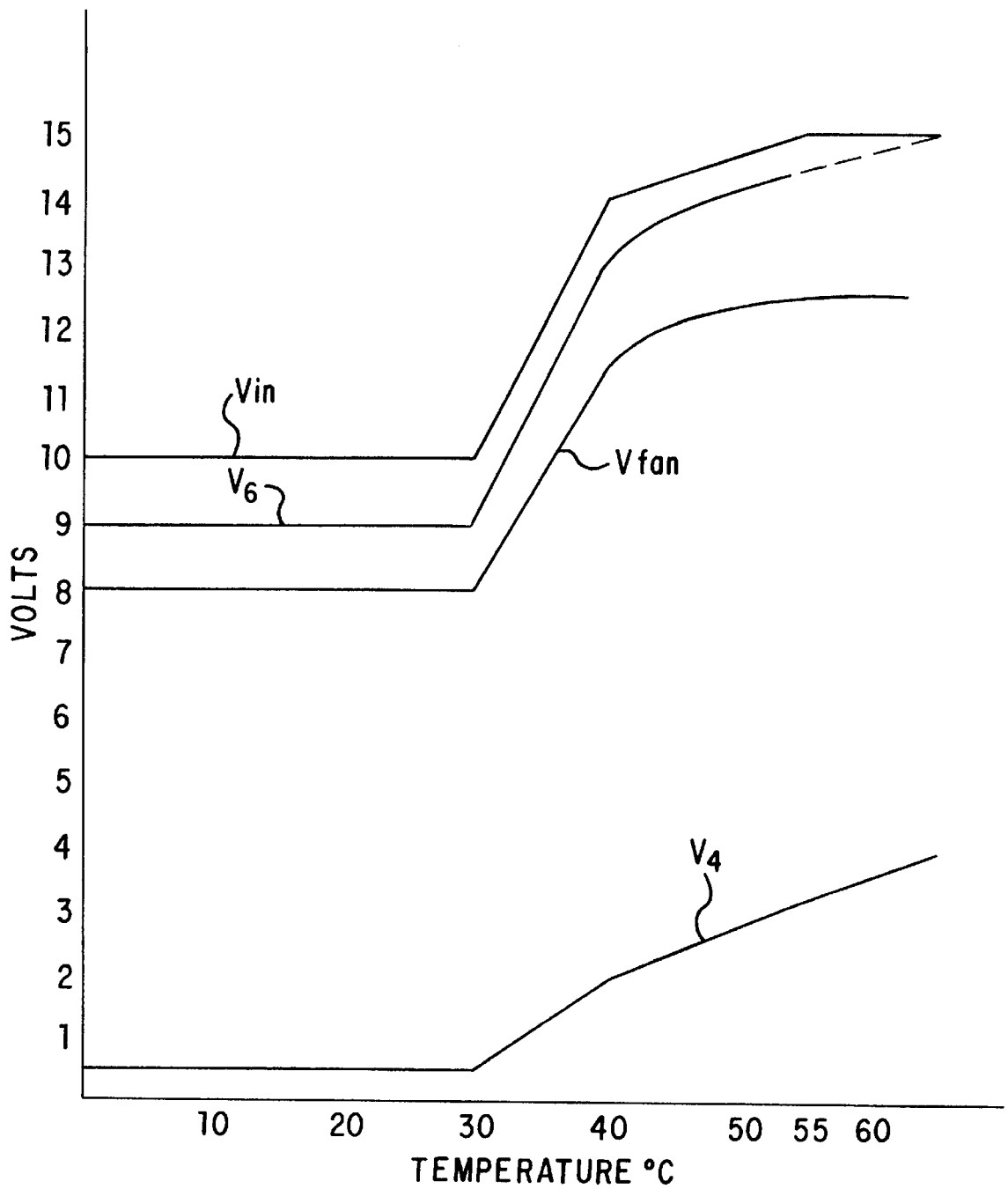
FIG. 3 is a graph illustrating the voltages Vin, V6, Vfan and V4, the air temperature alarm voltage of the circuit of FIG. 2 as a function of temperature.

As the temperature increases, the resistance of thermistor 11 decreases resulting in a smaller amount of voltage drop across the thermistor and thus a lower Vref at the control input to the IC39. The current I1 will thereby decrease, increasing the voltages V1 and V6 once IC39 comes out of saturation. This occurs when Vref decreases to 2.5 v. This occurs at a first predetermined temperature, e.g., 30° C. As temperature further increases, voltages V1 and V6 increase and maintain Vref at 2.5 v, the internal reference value. Thus, because V6 is determined by the ratio of resistor 13 to thermistor 11, as the resistance of thermistor 11 decreases, V6 increases. As illustrated in FIG. 3, the voltage ramp as a function of temperature rises quickly such as to provide a second predetermined fan voltage Vfan of about 12.5 volts to the fan at a temperature of 40° C., for example, with substantially linear operation between 30° C. and 40° C. The slope is controlled by the feedback of V6 which is the reference for the voltage divider containing thermistor 11. As the voltage Vin at junction 46 attempts to increase above a second predetermined value, e.g., 15 volts, it will be clamped at the maximum desired voltage by the circuit including the resistor divider made up of resistors 47 and 49 isolated by diode 45. However, V1 and V6 will continue to rise.

In accordance with a further feature of the present invention, an alarm voltage provides an alarm at a third predetermined temperature. In the circuit example given above, this alarm is provided at 55° C. This value was selected because it was desired to have the device being cooled, e.g., a power supply, such as will be shown below in connection with FIG. 4, operate up to and above an ambient temperature of 50° C. To accomplish this, the voltage ramp of FIG. 3 is continued for another 15 degrees but with a much smaller slope. In other words, the rate of rise of V1 and V6 must be slowed. This slope adjustment is provided by resistors 33 and 34 and diode 43. At temperatures above 40° C., the feedback voltage from V1 to Vref maintain Vref at the internal reference voltage of 2.5 v. As the voltage V1 increases, the voltage across resistors 33 and 34, and thus the voltage on the anode of diode 43, will increase until cathode voltage exceeds Vref. Diode 43 will then conduct and pass current to the IC39 control input C. As before, feedback maintains Vref equal to the internal reference voltage of 2.5 v. This provides a second feedback. The voltage V6 which is a function of V1 is fed back through resistor 13 and thermistor 11 controlling the first part of the slope in parallel with resistor 13. The feedback through diode 43 controls the second part of the slope. As a result, the voltage ramp at temperatures above 40° C. is determined by two voltage dividers, one being resistor 13 and thermistor 11 and the other resistors 33 and 34 through diode 43. By using this dual feed-back approach, the alarm voltage V4, which is picked off of the junction between the resistor divider made up of resistors 79 and 81, and coupled through diode 77 will reach its desired alarm value of e.g., 3.3 v at the desired predetermined temperature e.g., 55° C., as seen in FIG. 3.

It is apparent, that the voltage V1 generated by the precise reference is the voltage on which all of the other voltages in the system depend. Voltage V1 determines the value of the voltage V6, which will change as V1 changes since V1 constitutes the lower reference for the voltage divider made up of resistors 35 and 37. The ratio of the resistor 13 to the thermistor 11 resistance is selected such as to control the early part of the slope between the first and second predetermined temperatures. The slope of the voltage V1 as the temperature increases between the first predetermined temperature and second predetermined temperature is controlled by the feedback of V6 through resistor 13 and thermistor 11. The ratio of resistors 35 and 37 is selected in conjunction with V1 to develop a voltage V6 which, up to the limit established by the ratio of resistors 47 and 49 will provide a voltage at the level necessary to drive the motor first at the slow speed and then at a linearly increasing speed up to a maximum motor drive voltage. The voltage V1 is also the upper reference voltage for the voltage divider made up of resistors 33 and 34. At temperatures below 40° C. these resistors have minimal effect because voltage V1 is too low for a voltage to be developed at junction 32 which will be greater than the voltage at junction 41. However, as V1 begins to increase as the temperature exceeds the second predetermined value, the voltage at junction 32 begins to increase to a value greater than the value at the junction 41, providing a second feedback path to the control electrode of the integrated circuit 39. The ratio of the resistors 33 and 34 is selected such that, as V1 reaches a value corresponding to the second predetermined temperature, a voltage will be developed at the junction 32 which can be fed back to reduce the slope. The result is to reduce the rate of change of voltage so that a more gradual slope exists between the second predetermined temperature and third predetermined temperature as illustrated by FIG. 3.

Finally, the voltage V1 constitutes a reference for the voltage divider made up of resistances 79 and 81 at the junction 83 of which the alarm voltage is developed. The ratio of resistors 79 and 81 is thus selected so that, for a voltage V1 corresponding to the third predetermined temperature, the voltage V4 at the junction 83 will equal the required alarm output voltage.

The present invention also provides the detection of motor, i.e., fan failure. The motor current comprises pulses, the frequency of which is directly proportional to fan speed. Resistor 57 is a current sensing resistor which converts the motor current into a voltage V3. Resistor 57 thus develops an AC voltage proportional to fan current at terminal 21. This AC voltage is AC coupled through capacitor 59 to the base of transistor 61.

The pulses turn transistor 61 off and on in a pulsed manner. When transistor 61 is turned off, transistor 65 is momentarily turned on. When turned on, it discharges capacitor 71. While off, capacitor 71 recharges through resistors 67 and 69. Because resistor 67 is much larger than resistor 69, the capacitor 71 will discharge much more quickly than it charges. If the fan motor 18 stalls, capacitor 71 will not be periodically discharged and then will charge through resistors 67 and 69 sufficiently to reach a predetermined alarm voltage which is coupled through diode 73 to the alarm output terminal 75. This voltage is supplied to an alarm circuit, typically one having a precise reference equal to the alarm voltage. When the voltage at terminal 75 exceeds that precise voltage, e.g., 2.6 v (3.3 v minus the drop in diode 73), the alarm is triggered.

Figure 4:
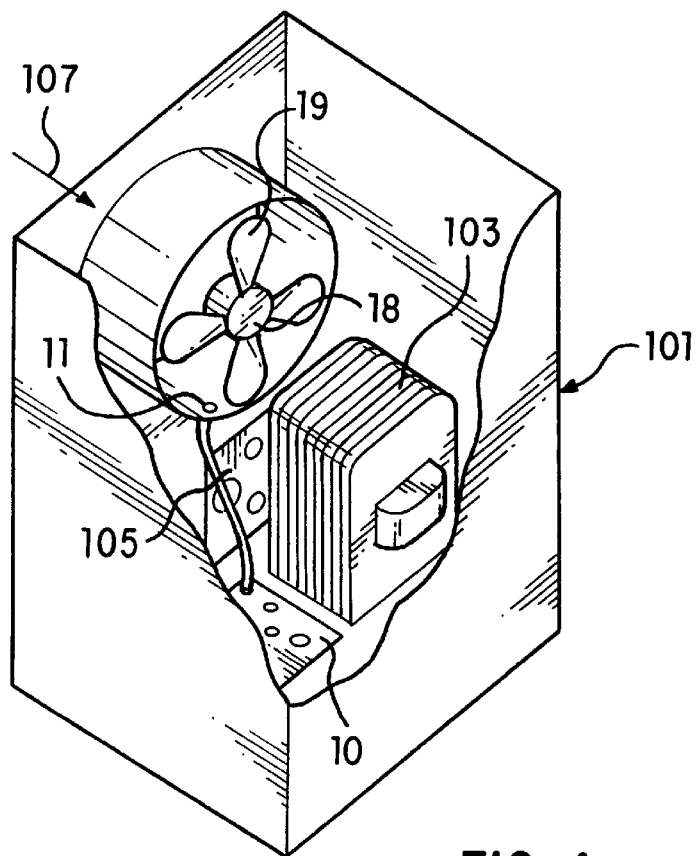
FIG. 4 is an illustration showing the circuit of the present invention in combination with a power supply and power supply fan.

FIG. 4 illustrates the circuit 10 of the present invention mounted in a power supply 101 having a cooling fan 19 driven by motor 18. Within the power supply are typical elements, such as a transformer 103 and circuit board 105, which must be cooled. The fan 19 draws air through the power supply in the direction of arrow 107. The thermistor 11 is mounted at the inlet of fan 19 to sense the temperature at that point. As previously explained, its resistance changes with temperature causing circuit 10 to provide variable voltage to the fan motor 18.

Figure 5:
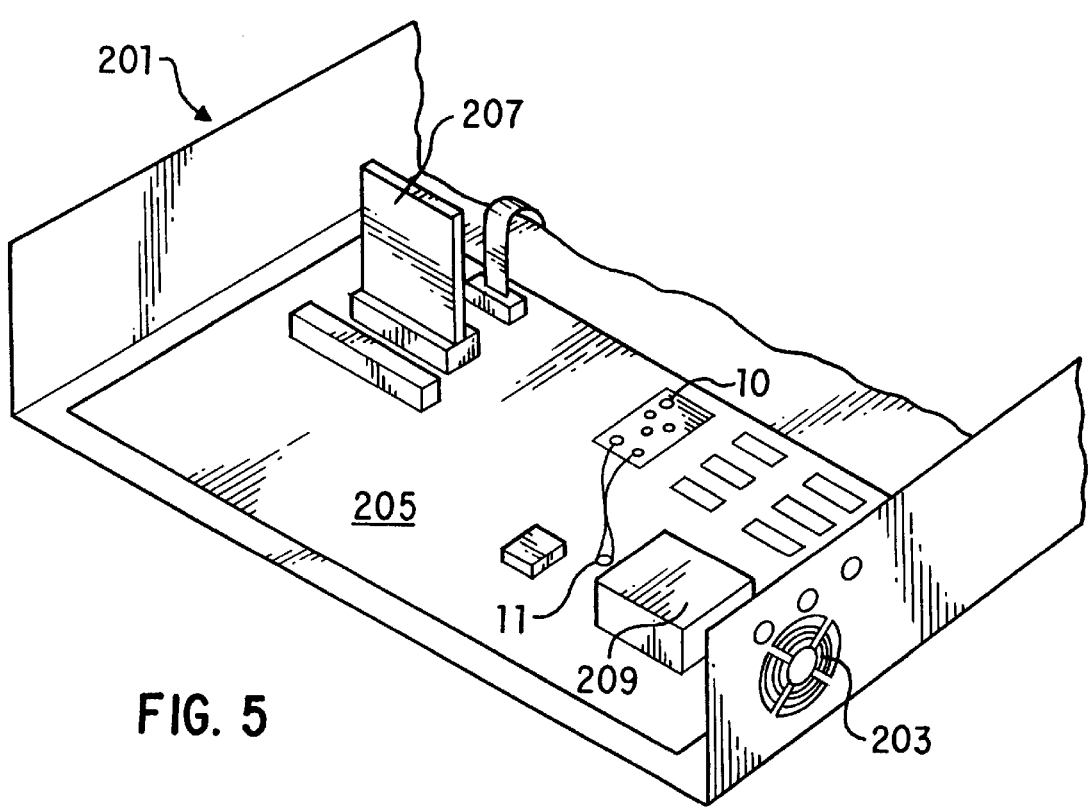
FIG. 5 is an illustration of the circuit of the present invention in combination with a fan cooling a computer system.

Similarly, as shown in FIG. 5, the circuit of the present invention can be used in combination with a secondary fan located behind vent opening 203 in a desk top computer 201 to provide further cooling for the circuit boards therein, such as the illustrated motherboard 205 into which additional daughter boards 207 are plugged. Thermistor 11 is near a processor 209 which is the device on the motherboard generating most of the heat.

What is claimed is:

1. A motor speed control circuit comprising:

a temperature sensor providing a first voltage output which is proportional to the temperature;

a control voltage generator having an internal voltage reference receiving said first voltage output as an input, said control voltage generator developing as an output a control voltage representative of a desired motor speed profile which increases with increasing temperature; and a motor drive circuit coupled to receive said motor control voltage and providing a motor drive voltage at its output.

2. A motor speed control circuit according to claim 1 wherein said control voltage generator includes a circuit feeding said control voltage back to said temperature sensor.

3. A motor speed control circuit according to claim 2 wherein said temperature sensor comprises a thermistor across which voltage inversely proportional to temperature is developed.

4. A motor speed control circuit according to claim 3 wherein said control voltage has a first value at temperatures below a first predetermined value, a second value when the temperature is above a second predetermined value and increases substantially linearly between said first voltage value and second voltage value as temperature varies between said first predetermined temperature and second predetermined temperature.

5. A motor speed control circuit according to claim 4 wherein said control voltage generator includes an integrated circuit containing said voltage reference and having a control input coupled to said first output voltage, said integrated circuit maintaining said control voltage at said first voltage value, at said second output when said thermistor voltage is above a minimum voltage value and a limiting circuit, for limiting said control voltage to said second predetermined value.

6. A motor control circuit according to claim 2 and further including an over-temperature sensing circuit coupled to said thermistor, said circuit providing an alarm output when said temperature exceeds a third predetermined value.

7. A motor control circuit according to claim 6 wherein said over-temperature circuit includes a circuit developing a second feedback voltage, said second feedback voltage coupled to said input of said control voltage generator.

8. A motor control circuit according to claim 1 and further including a current sensing circuit coupled to sense a flow of motor current when said motor control circuit is connected to a motor said current sensing circuit providing an alarm output upon sensing that said motor is stopped.

9. A motor control circuit according to claim 1 further including a motor, said motor coupled to said motor drive circuit and receiving said motor drive voltage.

10. A motor control circuit according to claim 4 further including a motor coupled to said motor drive voltage and a fan coupled to be driven by said motor and wherein said thermistor is disposed at the inlet to said fan.

11. A motor control circuit according to claim 10 and further including electronic equipment, said fan cooling said electronic equipment.

12. A motor control circuit according to claim 11 wherein said electronic equipment comprises a power supply.

13. A motor control circuit according to claim 11 wherein said electronic equipment comprises a computer system, said fan cooling said computer system.

14. A motor control system according to claim 11 wherein said first predetermined temperature is about 30° C. and said second predetermined temperature is about 40° C.

15. A method of controlling motor speed as a function of temperature comprising:

sensing a temperature and developing a voltage proportional to said temperature;

using said voltage proportional to temperature and a fixed reference voltage to develop a control voltage having profile over a temperature range representing a desired motor speed; and using said control voltage to develop a motor drive voltage which increases with increasing temperature; and driving a motor with said motor drive voltage.

16. The method according to claim 15 and further including feeding said control voltage back to generate said voltage proportional to temperature.

17. The method of claim 16 wherein said control voltage profile has a first minimum value below a first predetermined temperature, a second maximum value above a second predetermined temperature and varies substantially linearly between said first and second predetermined temperatures.

18. The method according to claim 17 and further including driving a fan with said motor and sensing of the temperature at the inlet to said fan to develop said proportional voltage.

19. The method according to claim 18 wherein said first predetermined temperature is about 30° C. and said second predetermined temperature about 40° C.

20. The method according to claim 18 and further including sensing stopping of said motor and providing an alarm output in response thereto.

21. The method according to claim 18 and further including sensing said temperature reaching a third predetermined value and providing an alarm output when said third predetermined value is reached.

22. A method according to claim 21 wherein the slope between said first and second predetermined temperatures is greater than the slope between said second and third predetermined temperatures.

23. A motor control circuit comprising:
a positive voltage terminal;
a negative voltage terminal;
a first voltage divider comprising a first resistor and thermistor in series having a first junction therebetween, a voltage Vref developed at said first junction;
an integrated circuit having an internal voltage reference and having an anode, a cathode and a control terminal, said control terminal coupled to said first junction;
second and third resistors, coupled in series and having a second junction therebetween and coupled in series with said integrated circuit, between said negative and positive voltage terminals, with a third junction between said integrated circuit and said third resistor, said anode of said integrated circuit connected to said negative voltage, a voltage V1 being developed at the cathode of said integrated circuit;
said integrated circuit providing a minimum voltage when said reference voltage at said control input is greater than said reference voltage;
said thermistor having its free terminal coupled to said negative voltage terminal and said first resistor having its free terminal coupled to said second junction; and
a control voltage output terminal coupled to said second junction.

24. A motor control circuit according to claim 23 and further including:
a third voltage divider comprising fourth and fifth resistors having a fourth junction therebetween coupled between said positive voltage terminal and a potential lower than that of said positive voltage terminal; and
a first diode extending between said second junction and said fourth junction with the anode of said diode coupled to said fourth junction, said voltage at said fourth junction being a limited control voltage.

25. A motor control circuit according to claim 24 and further including:
a first motor terminal
a Darlington pair of transistors, including a first transistor and a second transistor, the base of said first transistor coupled to said fourth junction, the emitter of said first transistor coupled to said first motor terminal and the collector of said first transistor coupled to the positive voltage terminal, said second transistor having its base coupled to the emitter of said first transistor, its emitter coupled to said first motor terminal and its collector coupled to said positive voltage terminal; and
a second motor terminal coupled to said negative voltage terminal.

26. A motor control circuit according to claim 25 and further including:
a current sensing resistor between said second motor terminal and said negative voltage terminal;
a third transistor having its collector coupled to said positive voltage and its emitter coupled to ground;
a first capacitor coupling the base of said third transistor to said second motor terminal;
a fourth transistor having its base coupled to the collector of said third transistor, its collector coupled to the positive voltage terminal and its emitter coupled to ground;
a series circuit comprising a sixth resistor and second capacitor coupled between the collector of said fourth transistor and ground having a fifth junction therebetween;
an alarm output terminal; and
a diode having its anode coupled to said fifth junction and its cathode to said alarm output terminal.

27. A motor control circuit according to claim 26 and further including:
a fourth voltage divider comprising a seventh resistor and a eighth resistor extending between said third junction and said negative voltage terminal forming a sixth junction;
a fifth voltage divider comprising ninth and tenth resistors extending from said third junction to ground;
a third diode having its anode coupled to said sixth junction and its cathode to said first junction; and
a fourth diode having its anode coupled to said seventh junction and its cathode coupled to said alarm output terminal.

28. A motor control circuit according to claim 23 and further including:
an alarm output terminal;
a fourth voltage divider comprising a seventh resistor and an eighth resistor extending between said third junction and said negative voltage terminal forming a sixth junction;
a fifth voltage divider comprising ninth and tenth resistors extending from said third junction to ground;
a third diode having its anode coupled to said sixth junction and its cathode to said first junction; and
a fourth diode having its anode coupled to said seventh junction and its cathode coupled to said alarm output terminal.

29. A circuit for developing a precise voltage as a function of temperature comprising:
a positive voltage terminal;
a negative voltage terminal;
a voltage reference element having a precise internal reference voltage and having an anode, a cathode and a control electrode;
a first voltage divider comprising a first resistor and a second resistor in series, a first junction being formed therebetween, said voltage divider coupled in series with said voltage reference element between the positive and negative voltage terminals with the anode of said element coupled to the negative voltage terminal and its cathode to said first voltage divider; and
a second voltage divider comprising a third resistor and a thermistor in series, forming a second junction therebetween, said thermistor coupled to said negative voltage terminal and the free end of said third resistor coupled to said first junction, said second junction coupled to said control electrode, said precise voltage being developed at said first junction.

30. The circuit of claim 29 and further including:
a third voltage divider including fourth and firth resistor in series with a third junction therebetween coupled between the positive voltage terminal and ground; and
a diode having its anode coupled to said third junction and its cathode to said second junction, the voltage at said junction being a third voltage limited by voltage divider and said diode.

31. A circuit according to claim 30 and further including a motor driver circuit having the voltage developed at said third junction as an input and providing a motor voltage output.

32. A circuit according to claim 31 wherein said motor driver circuit comprises a Darlington pair of transistors.

33. A circuit according to claim 31 and further including:
- a fourth voltage divider comprising sixth and seventh resistors forming a fifth junction therebetween coupled between the cathode of said voltage reference element and the negative voltage terminal; and
- a second diode having its anode coupled to said fifth junction and its cathode coupled to said second junction.

34. A circuit according to claim 33 and further including a fifth voltage divider comprising eighth and ninth resistors coupled between said fifth junction and the negative voltage terminal the values of said eighth and ninth resistors selected to provide a voltage at their junction which reaches a predetermined alarm voltage at a third predetermined temperature.

35. A fan motor speed control circuit comprising:
- a motor;
- a fan coupled to be driven by said motor;
- a temperature sensor disposed at the inlet of said fan providing a first voltage output which is proportional to temperature;
- a control voltage generator receiving said first voltage output as an input, said control voltage generator developing as an output a control voltage representative of a desired motor speed profile which increases with increasing temperature; and
- a motor drive circuit coupled to receive said motor control voltage and providing a motor drive voltage at its output, said motor drive voltage coupled to said motor.

36. A motor speed control circuit according to claim 35 wherein said control voltage has a first value at temperatures below a first predetermined value, a second value when the temperature is above a second predetermined value and increases substantially linearly between said first voltage value and second voltage value as temperature varies between said first predetermined temperature and second predetermined temperature.

37. A method of controlling the speed of a motor driven fan as a function of temperature comprising:
- sensing a temperature at the inlet of the fan and developing a voltage proportional to said temperature;
- developing a control voltage having profile over a temperature range representing a desired motor speed using said voltage proportional to temperature; and
- developing a motor drive voltage using said control voltage; and
- driving said motor driven fan with said motor drive voltage.

38. The method of claim 37 wherein said control voltage profile has a first minimum value below a first predetermined temperature, a second maximum value above a second predetermined temperature and varies substantially linearly between said first and second predetermined temperatures.

* * * * *